United States Patent
Couchot et al.

(10) Patent No.: US 10,480,420 B2
(45) Date of Patent: Nov. 19, 2019

(54) METHODS AND SYSTEMS FOR CONTROLLING TURBINE POWERED SYSTEM TO REDUCE STARTUP TIME

(71) Applicant: General Electric Company, Schenectady, NY (US)

(72) Inventors: Myriam Couchot, Belfort (FR); Christian Solacolu, Belfort (FR); Pierre Beaufrere, Belfort (FR)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 15/462,156

(22) Filed: Mar. 17, 2017

(65) Prior Publication Data

US 2018/0266331 A1 Sep. 20, 2018

(51) Int. Cl.
*F02C 9/18* (2006.01)
*F01D 21/12* (2006.01)

(52) U.S. Cl.
CPC .............. *F02C 9/18* (2013.01); *F01D 21/12* (2013.01); *F05D 2270/303* (2013.01)

(58) Field of Classification Search
CPC .......... F02C 9/18; F01K 23/101; F01K 13/02; F01D 21/12; F05D 2270/303
See application file for complete search history.

(56) References Cited

U.S. PATENT DOCUMENTS

2005/0268594 A1* 12/2005 Kurihara .................. F02C 9/16
60/39.182
2009/0000267 A1* 1/2009 Law .......................... F02C 9/20
60/39.182
2009/0145104 A1* 6/2009 Alexander ............. F01K 23/101
60/39.182
2011/0140372 A1* 6/2011 Buttell ................... F01D 11/005
277/625
2011/0146290 A1 6/2011 Vernet et al.
2012/0198846 A1* 8/2012 Sieben .................... F01K 23/10
60/653
2013/0247579 A1 9/2013 Morawski et al.
(Continued)

OTHER PUBLICATIONS

David S. Moelling "Startup Purge Credit Benefits Combined Cycle Operations", Jun. 1, 2012, pp. 1-6 from https://www.powermag.com/startup-purge-credit-benefits-combined-cycle-operations/?printmode=1.*

(Continued)

*Primary Examiner* — Ted Kim
(74) *Attorney, Agent, or Firm* — Nixon & Vanderhye P.C.

(57) ABSTRACT

A method for operating a power plant may include, during shutdown of a turbine, controlling a damper to move from a first position directing turbine exhaust to enter a heat recovery system to a second position to allow the turbine exhaust to enter a bypass stack and block the turbine exhaust to the heat recovery system. While the position of the damper is maintained in the second position, fired shutdown of the turbine may be performed. In response to instructions to start the turbine, air flow in an exhaust duct for a predetermined period of time is generated, and after generating the air flow for the predetermined period of time, the turbine may be started without performing a purge sequence for the heat recovery system. After starting the turbine, the damper may be controlled between the second position and the first position.

13 Claims, 5 Drawing Sheets

(56) References Cited

U.S. PATENT DOCUMENTS

2015/0159561 A1 6/2015 Seely et al.
2016/0102615 A1* 4/2016 Trippold .................. F02C 3/04
60/772

OTHER PUBLICATIONS

GE Energy, "FlexEfficiency* 50 combined cycle power plant", Apr. 19, 2012, EE Publishers, Published in Articles: Energize, pp. 1-4.*
Fabricius et al "Impact of Startup Purge Credit on Combined Cycle Plant Operation" Jun. 28-Jul. 2, 2015; Paper No. POWER2015-49101, pp. V001T09A002; 8 pages doi:10.1115/POWER2015-49101.*
NFPA 85 "Boiler and Combustion Systems Hazards Code" pp. 1-241, (2011 Edition).

* cited by examiner

METHODS AND SYSTEMS FOR CONTROLLING TURBINE POWERED SYSTEM TO REDUCE STARTUP TIME

BACKGROUND OF THE INVENTION

The invention disclosure relates generally to power plants and, more particularly, to methods and apparatuses for controlling the operation (e.g., startup and shutdown) of a power plant capable of operating in a combined cycle so as to minimize startup duration.

Environmental impact is under ever-increasing scrutiny as the world demand for energy continues to rise. To mitigate the environmental impact, energy producers have resorted to utilizing renewable energy sources. At the same time, energy producers are developing new technologies to reduce pollution and to improve power generation efficiency of existing energy sources.

Energy producers use gas turbines to generate electricity due to their efficiency and output flexibility. In a gas turbine, natural gas or other liquid fuel is burned to generate a hot air-fuel mixture that moves blades, generating mechanical energy. The mechanical energy drives a generator to produce electricity. To improve power generation efficiency, exhaust heat from gas turbines has been used to recover additional energy. A combined-cycle power plant includes a gas turbine and a Heat Recovery Steam Generator (HRSG) that captures the exhaust heat from the gas turbine that would otherwise escape though an exhaust stack. The HRSG may use the exhaust heat to produce steam that is used to drive a steam turbine to generate additional electricity.

A challenge with combined-cycle power plant is to provide a successful start from standstill. A successful start depends on many factors such as steam chemistry, establishment of seals, vibration, overspeed and thrust control. In addition, while considering these factors, it is desired to minimize the time required to successfully start the power plant without significant stress on the component of the power plant. The startup time may further be increased due to the need to remove buildup of combustible gas in various portions of the power plant during the shutdown process.

SUMMARY OF THE INVENTION

Exemplary embodiments of this disclosure provide methods and apparatus for controlling the operation (e.g., startup and shutdown) of a power plant capable of operating in a combined cycle so as to minimize startup duration.

In some embodiments, a method for operating a power plant including a turbine, a heat recovery system, a bypass stack and an exhaust duct, including a damper configured to direct the flow of exhaust from the turbine to the heat recovery system and/or to the bypass stack, the method comprising: before flame out during fired shutdown of the turbine, control the damper to move from a first position directing turbine exhaust to enter the heat recovery system to a second position to allow the turbine exhaust to enter the bypass stack and block the turbine exhaust to the heat recovery system. While the position of the damper is maintained in the second position to prevent gas and/or vapor to enter the heat recovery system: performing fired shutdown of the turbine; in response to instructions to start the turbine, generating air flow in the exhaust duct for a predetermined period of time; and after generating the air flow for the predetermined period of time, starting the turbine without performing a purge sequence for the heat recovery system. After starting the turbine, the damper may be controlled to move from the second position to the first position to allow the turbine exhaust to enter the heat recovery system and to block the turbine exhaust to the bypass stack.

In another exemplary embodiment, a method for operating a power plant including a turbine, a heat recovery system, a bypass stack and an exhaust duct including a damper configured to direct the flow of exhaust from the turbine to the heat recovery system and/or to the bypass stack. The method comprising: before flame out during fired shutdown of the turbine, control the damper to move from a first position directing turbine exhaust to enter the bypass stack to a second position to allow the turbine exhaust to enter the heat recovery system and block the turbine exhaust to the bypass stack. While the position of the damper is maintained in the second position to prevent gas and/or vapor to enter the bypass stack: performing fired shutdown of the turbine; in response to instructions to start the turbine, generating air flow in the exhaust duct for a predetermined period of time; and after generating the air flow for the predetermined period of time, starting the turbine without performing a purge sequence for the bypass stack; and after starting the turbine, control the damper to move between the second position and the first position based on the operation of the power plant.

In another exemplary embodiment, a power plant may include a turbine; a heat recovery system; a bypass stack; an exhaust duct including a damper configured to selectively direct the flow of exhaust from the turbine to the heat recovery system or to the bypass stack; and a processing system, including at least one processor. The processing system may be configured to at least: before flame out during fired shutdown of the turbine, control the damper to move from a first position directing turbine exhaust to enter the heat recovery system to a second position to allow the turbine exhaust to enter the bypass stack and block the turbine exhaust to the heat recovery system; while the position of the damper is maintained in the second position to prevent gas and/or vapor to enter the heat recovery system: perform fired shutdown of the turbine; in response to request to start the turbine, generate air flow in the exhaust duct for a predetermined period of time; and; after generating the air flow for the predetermined period of time, start the turbine; and after starting the turbine without performing a purge sequence for the heat recovery system; and control the damper to move from the second position to the first position to allow the turbine exhaust to enter the heat recovery system and to block the turbine exhaust to the bypass stack.

BRIEF DESCRIPTION OF THE DRAWINGS

These and other features, aspects, and advantages of the present invention will become better understood when the following detailed description is read with reference to the accompanying drawings in which like characters represent like parts throughout the drawings.

DETAILED DESCRIPTION OF THE INVENTION

Figure 1:
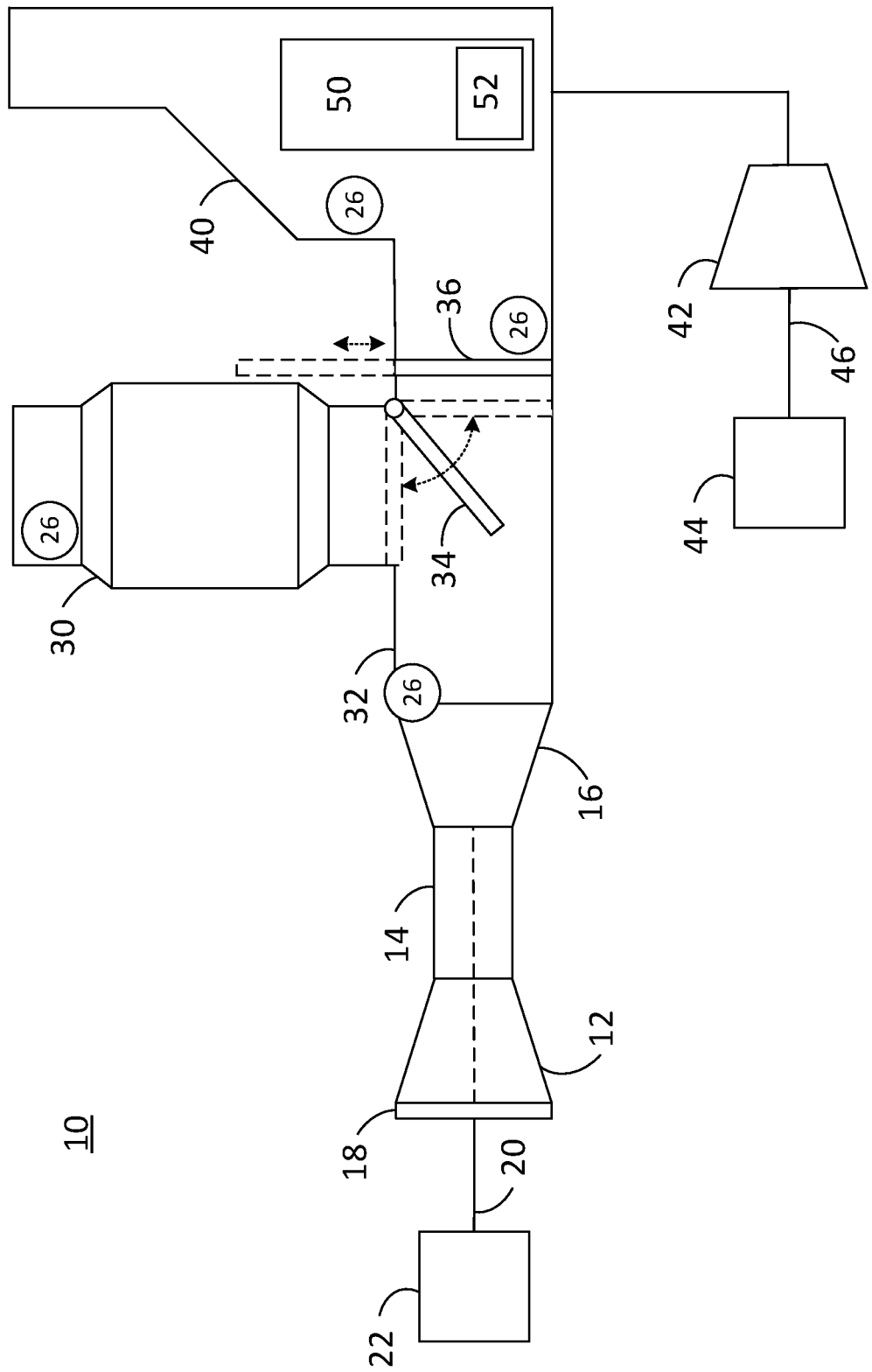
FIG. 1 illustrates a power plant according to an embodiment of the present disclosure.

Exemplary embodiments of this disclosure provide methods and apparatuses for controlling the operation (e.g., startup and shutdown) of a power plant capable of operating in a combined cycle. The methods discussed in this disclosure provide for operation of the power plant so as to minimize startup duration. The startup duration can be reduced by controlling a bypass damper configured to direct flow of exhaust gas, in a manner that ensures that portions of the power plant are made "clean" during the shutdown process and/or during the initial stage of the startup. By ensuring that one or more flow paths of the power plant are "clean" before startup and/or during the initial stage of the startup, purging operations on one or more sections of the power plant may be avoided.

For example, a startup purge sequence on one path of a turbine exhaust including a diverter damper may be avoided as long as full isolation by the diverter damper is provided (e.g., to provide diverter damper sealing air). A purge credit for a heat recovery system may be granted if the diverter damper is switched over to a closed position while the turbine was fired (so no unburned fuel is introduced into the heat recovery system), the diverter damper remains closed to the heat recovery system, and sealing in operation prevents any unburned gas or vapor to enter the heat recovery system, when the turbine is stopped. Thus, when operation of the turbine stops, any potential fuel supply gas leak will be avoided in the heat recovery system and only reach the bypass stack.

In another example, a bypass purge credit can be granted if the diverter damper is switched over to an open position while the turbine is fired (so that no unburned fuel enters the bypass stack), the diverter damper remains open to the heat recovery system, and sealing in operation prevents any unburned gas or vapor to enter the bypass stack, when the turbine is stopped. Thus, when operation of the turbine stops, any potential fuel supply gas leas will be avoided in the bypass stack and only reach the heat recovery system.

The purge credits of the heat recovery system and/or the bypass stack disclosed in this application may be combined with one or more other purge credits discussed in this application and known to those skilled in the art. For example, the purge credits of the heat recovery system and/or the bypass stack disclosed in this application may be combined with purge credits disclosed in NFPA® 85 Boiler and Combustion Systems Hazards Code.

The operations for controlling the power plant may be performed automatically by a processing system in response to an operator request or triggering events of the power plant or energy supply system. The operations and steps disclosed in this application provide for efficient operation of the power plant and allow the power plant to produce desired energy faster. For example, in a power plant including a diverter damper that takes eight to fifteen minutes to clean and start the power plant, embodiments of this disclosure may reduce the time to two minutes with bypass purge credit.

FIG. 1 illustrates a power plant 10 according to an embodiment of the present disclosure. The power plant 10 may include a compressor 12, a combustor 14, a turbine 16, a bypass stack 30, and a heat recovery system 40. While single components are illustrated in FIG. 1, embodiments of this disclosure are not so limited and may include a plurality of compressors, combustors, turbines, bypass stacks, and/or heat recovery systems connected in series and/or in parallel.

The turbine 16 may be coupled to the compressor 12 and/or a generator 22 through one or more shafts 20. During operation, the compressor 12 may receive air via an inlet filter 18, compress the air, and supply compressed air to the combustor 14. In the combustor 14, fuel such as natural gas may be introduced and burned to generate hot combustion gases. The combustion gases may be discharged to the turbine 16 that is rotationally driven due to the expansion of the combustion gases. The rotation of the turbine 16 may be used to rotate a generator 22 through shaft 20 to generate power.

The turbine 16 may be coupled to the bypass stack 30 and the heat recovery system 40 via an exhaust duct 32. The exhaust duct 32 may include an inlet coupled to the exhaust outlet of the turbine 16 to receive the high temperature exhaust gas from the turbine 16. The exhaust duct 32 may include a first outlet coupled to the bypass stack 30 and a second outlet coupled to the heat recovery system 40. The bypass stack 30 may receive the high temperature exhaust gas and direct it outside of the power plant 10.

The heat recovery system 40 may receive the high temperature exhaust gas, recover heat from the high temperature exhaust gas, heat water, and produce steam. The heat recovery system 40 may include a boiler 50 to generate the steam. In one embodiment, the heat recovery system 40 may include a supplementary fire duct burner 52 in the boiler 50. The steam may be directed to a steam turbine 42 configured to rotate due to the steam. The rotation of the steam turbine 42 may rotate a generator 44 through shaft 46 to generate additional power. In other embodiments, the steam from the heat recovery system 40 may be used for other applications (e.g., heating or desalination).

As illustrated in FIG. 1, the exhaust duct 32 may include a bypass damper 34 inside of the exhaust duct 32. The bypass damper 34 may be a sandwich-type flap, with independent expandable double skin blades. The blades may be actuated by a toggle lever system and powered by hydraulics controls. The bypass damper 34 and the drive components for the bypass damper 34 may be manufactured from materials which can withstand the exhaust gas environment.

The bypass damper 34 may be controlled to direct the flow of exhaust gas to the bypass stack 30 or to the heat recovery system 40. The bypass damper 34 may be configured to completely shut off the flow of exhaust gas to the bypass stack 30 or to the heat recovery system 40. For example, a controller may control the position of the bypass damper 34 to be in a first position (vertical) to shut off the flow of exhaust gas to the heat recovery system 40. The controller may control the position of the bypass damper 34 to be in a second potion (horizontal) to shut off the flow of the exhaust gas to the bypass stack 30.

While in FIG. 1 a flat type bypass damper 34 is illustrated, the embodiments of this disclosure are not so limited, and other types of dampers may be used to stop the flow of exhaust gas to the bypass stack 30 and/or to the heat recovery system 40. For example, a bi-plane damper may be installed at the outlets of the exhaust duct 32 and/or the inlets to the bypass stack 30 and/or to the heat recovery system 40. In another embodiment, a guillotine blanking plate may be used to control the flow of the exhaust gas.

The power plant 10 may further include an isolator 36 to isolate air or air/gas mixture from the heat recovery system 40. The isolator 36 may be a guillotine or blanking plate that is configured to isolate the bypass damper 34 from the heat recovery system 40. The isolator 36 may be positioned adjacent to the bypass damper 34. The isolator 36 may be included in the exhaust duct 32 or in the heat recovery system 40. The isolator 36 may be a bolted plate supplied along with the diverter bypass damper 34 and may remain in place before the commissioning of the heat recovery system 40 to allow the power plant 10 to operate in the simple cycle. In one embodiment, the isolator 36 may not provide thermal insulation.

The power plant 10 may include one or more sensors 26 to monitor the operation of the power plant. The sensors 26 may monitor the temperature, moisture, flow speed, and/or exhaust composition. The processing system of the power plant may receive data from the sensors 26, analyze the data to determine the operating state of the power plant, and generate controls for the power plant based on the received data from the sensors 26.

During operation, the power plant 10 may be controlled to operation in a simple cycle to generate energy only from the operation of the turbine or in a combined cycle to generate energy from the operation of the turbine 16 and the heat recovery system 40. In the simple cycle, the bypass damper 34 may be controlled to be in the first position (vertical) to shut off the flow of exhaust gas to the heat recovery system 40. In the simple cycle, the exhaust gas from the turbine 16 may flow to the bypass stack 30 via the exhaust duct 32. In the combined cycle, the bypass damper 34 may be controlled to be in the second position (horizontal) to shut off the flow of exhaust gas to the bypass stack 30. In the combined cycle, the exhaust gas from the turbine 16 may flow to the heat recovery system 40 via the exhaust duct 32, to recover additional energy from the exhaust gas.

When starting up the power plant 10, the power plant 10 may be set in simple cycle or combined cycle. For startup in the simple cycle the bypass damper 34 may be set in the first position (vertical) to shut off the flow of exhaust gas to the heat recovery system 40 and to allow the generated exhaust gas to flow to the bypass stack 30. After the start-up of the turbine 16, the exhaust gas is introduced into the exhaust duct 32 and all of the exhaust gas flows outside of the power plant 10 via the bypass stack 30. After predetermined conditions are satisfied (e.g., predetermined time period, temperature, composition of the exhaust gas), the bypass damper 34 may be controlled to transition to a second position (horizontal) to allow the exhaust gas to flow to the heat recovery system 40 and the block the exhaust gas from flowing to the bypass stack 30.

During the transition from the first position to the second position, a portion of the exhaust gas may flow to the heat recovery system 40 and a portion of the exhaust gas may flow to the bypass stack 30. By controlling the speed of the transition, the amount of exhaust gas introduced into the heat recovery system 40 may be controlled to reduce stress on the components of the heat recovery system 40 due to a drastic temperature change.

The bypass damper 34 may introduce hazards to heat recovery system of the power plant 10. For example, overpressure in the exhaust duct 32 can occur in a case that the bypass damper 34 is in the second position (to shut off the flow of exhaust gas to the bypass stack 30) and the air isolator 36 or stack damper of the heat recovery system 40 is closed. To reduce the possibility of overpressure in the exhaust duct 32, the control system may be configured to automatically control the bypass damper 34 to be in the second position (to allow flow of exhaust gas to the bypass stack 30) when the air isolator 36 or stack damper of the heat recovery system 40 is determined to be closed.

Another hazard that may exist in the power plant 10 is the buildup of gas or vapor clouds, which may easily ignite due to high surface temperatures caused by the operation of the turbine 16 and/or components of the heat recovery system 40. To reduce the possibility of buildup of gas or vapor clouds, a purge may be performed on the exhaust duct 32, bypass stack 30, and the heat recovery system 40. The power plant 10 or a specific path of the power plant may be considered "clean" when it is purged and flammable gas or combustible vapors cannot enter the path.

To provide a clean power plant 10 before startup of the turbine, a number of different purges may need to be performed. A hot purge may be performed in which the power plant 10 is purged while the turbine 16 is fired. During the hot purge the exhaust temperature of the turbine 16 may be controlled to be below a predetermined temperature. The predetermined temperature may be the METP (Maximum Exhaust Temperature for Purge) or autoignition temperature (AIT). METP temperature may be the AIT temperature minus 56° C. The AIT temperature may be minimum temperature required to initiate or cause self-sustained combustion of a solid, liquid, or gas independently of the heating or heated element.

A cold purge may be performed while the turbine 16 is not fired. During the cold purge the exhaust duct 32, bypass stack 30, and/or the heat recovery system 40 may be purged.

Section 8.8 of the NFPA® 85 Boiler and Combustion Systems Hazards Code (2011 Edition) provides minimum purge flow guidelines that need to be satisfied prior to light-off of the turbine to evacuate any unburned gas or vapor accumulated in the boiler. Section 8.8.4.2.1.1 states that a purge prior to the light-off of the combustion turbine shall be accomplished by at least five volume changes and for a duration of not less than five minutes. This volume change includes the turbine exhaust and the heat recovery system to the point where the exhaust temperature is less than the METP (Maximum Exhaust Temperature for Purge) but not less than the outlet of the first evaporator with a minimum air flow corresponding to 8% of the turbine nominal flow at ISO conditions.

A by-pass purge may be performed before the startup of the turbine. The startup sequence of the turbine may include a purge that results in a non-ignitable atmosphere in the turbine and its exhaust system prior to the start of the ignition sequence and the introduction of fuel. The bypass purge may be defined as a minimum of two minutes and provide five times volume exchanges with a minimum flow corresponding to 8% of the standard flow in ISO conditions.

A duct burning purge may also be needed before ignition of the duct burner. In the duct burning purge, the turbine flow may be at minimum 25% of the standard flow for more than the time to renew eight times the total heat recovery system volume. The duct burning purge is a separate purge sequence that occurs after the turbine light off No requirement regarding the purge media temperature is provided for the duct burning purge.

Figure 2:
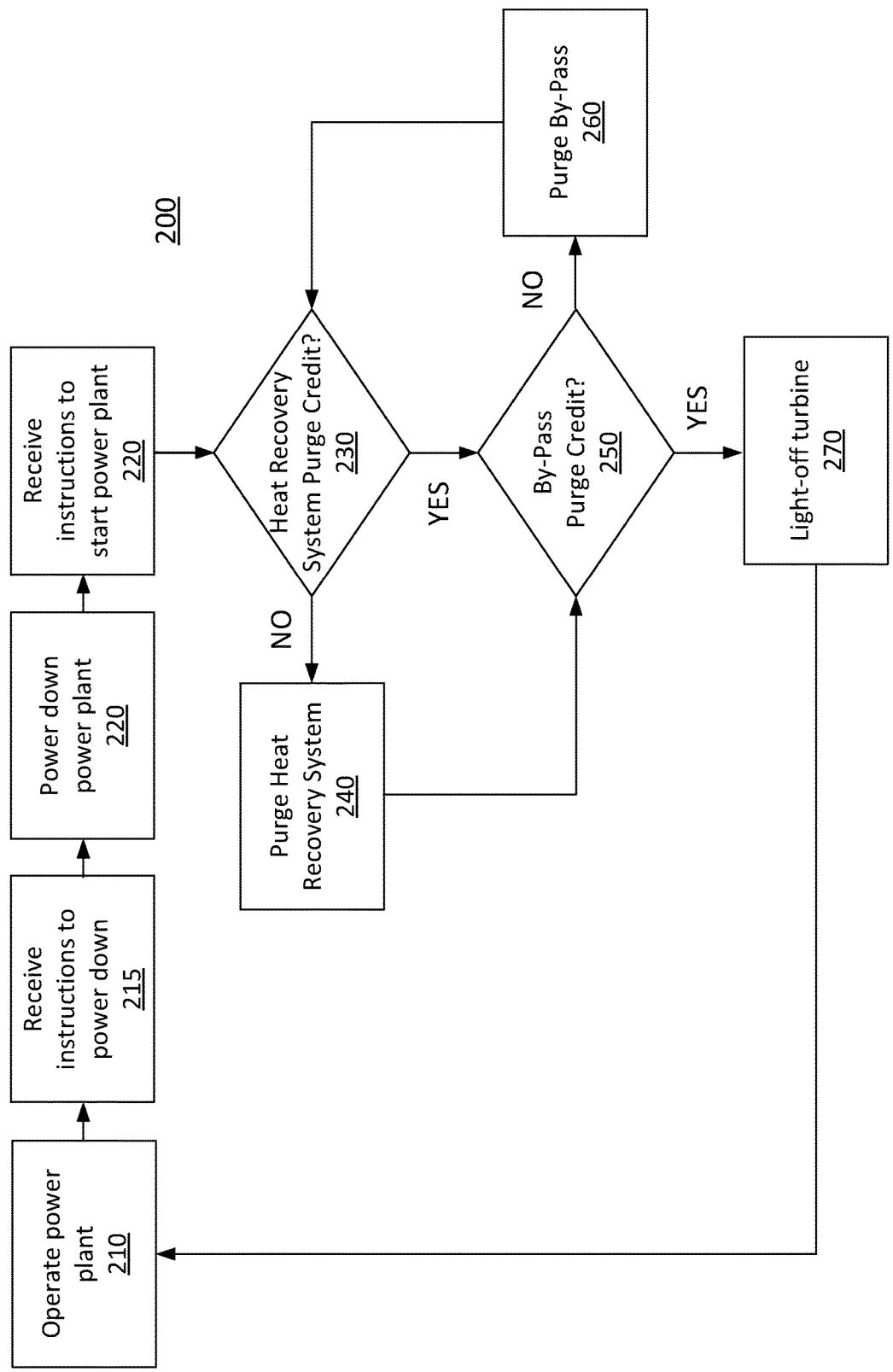
FIG. 2 illustrates a method for operating a power plant including turbine and a heat recovery system according to an embodiment of the present disclosure.

FIG. 2 illustrates a method 200 for operating a power plant including turbine and a heat recovery system according to an embodiment of the present disclosure. The method 200 may be performed by one or more control systems of the power plant illustrated in FIG. 1.

The power plant may operate 210 according to the desired energy output by the turbine and/or the heat recovery system. The output of the load of the turbine may be used by the control system to control the operation of the turbine.

Measurements from sensors (e.g., exhaust temperature measured at one or more locations of the power plant) may be used as a parameter to control the operation of the power plant. Depending on the desired energy output, the power plant may be operated 210 in simple cycle or combined cycle.

When instructions are received to power down the power plant 215 (e.g., in response to an operator request or an automatically initiated process), the turbine may be controlled to power down 220. During this step, other operations of the power plant in the heat recovery system may also be controlled to power down. As will be discussed in more detail below, during the power down of the power plant, the operation of the turbine and the damper may be controlled to provide a purge credit for the heat recovery system and/or the by-pass system.

For example, a startup purge sequence (e.g., see steps 240 and 260) on one path of a turbine exhaust including a diverter damper may be avoided as long as full isolation by the diverter damper is provided (e.g., to provide diverter damper sealing air). A purge credit for a heat recovery system may be granted if the diverter damper is switched over to a closed position while the turbine was fired (so no unburned fuel is introduced into the heat recovery system), the diverter damper remains closed to the heat recovery system, and sealing in operation prevents any unburned gas or vapor to enter the heat recovery system, when the turbine is stopped. Thus, when operation of the turbine stops, any potential fuel supply gas leak will be avoided in the heat recovery system and only reach the bypass stack.

In another example, a bypass purge credit can be granted if the diverter damper is switched over to an open position while the turbine is fired (so that no unburned fuel enters the bypass stack), the diverter damper remains open to the heat recovery system, and sealing in operation prevents any unburned gas or vapor to enter the bypass stack, when the turbine is stopped. Thus, when operation of the turbine stops, any potential fuel supply gas leas will be avoided in the bypass stack and only reach the heat recovery system.

When energy is needed, instructions may be provided to the control system to start the power plant 225. The instructions may request to operate the power plant in simple cycle or combined cycle. In response to the instructions, the power plant may be started by light-off of the turbine 270. Before the light-off of the turbine 270, a determination may be made as to whether the heat recovery system purge credit is valid 230 and whether by-pass purge credit is valid 250. If the heat recovery system purge credit is not valid (NO in step 230), a purge of the heat recovery system 240 may be performed. If the by-pass purge credit is not valid (NO in step 250), a purge of the by-pass stack 260 may be performed. As illustrated in FIG. 2, after the purge of the by-pass stack, the method may determine again whether the heat recovery system purge credit is still valid in step 230. Alternatively, after the purge of the by-pass stack, the method may light-off the turbine 270.

The purge credit is obtained when the flow path is proven to be in a "clean" state and flammable gas or combustible vapors cannot enter the path. The purge credit may be obtained by a hot purge or a cold purge, which may be longer than the hot purge. During the cold purge the flow path of the heat recovery system and/or the bypass stack are purged sequentially or in parallel while the turbine is not fired. Because performing the hot purge on both the heat recovery system and the bypass stack may be time consuming, a hot purge may be performed before or during the shutdown of the turbine. During the hot purge, the heat recovery system may be purged while the turbine is fired. During the hot purge, the exhaust temperature of the turbine may be maintained below the METP temperature. In one embodiment, the purge may be performed during start up but before the METP is reduced.

Various methods to obtain and/or maintain a purge credit are provided below. One or more of the following methods may be performed to reduce the amount of time needed to perform the purge of the heat recovery system and/or the bypass stack before the turbine is started.

Figure 3:
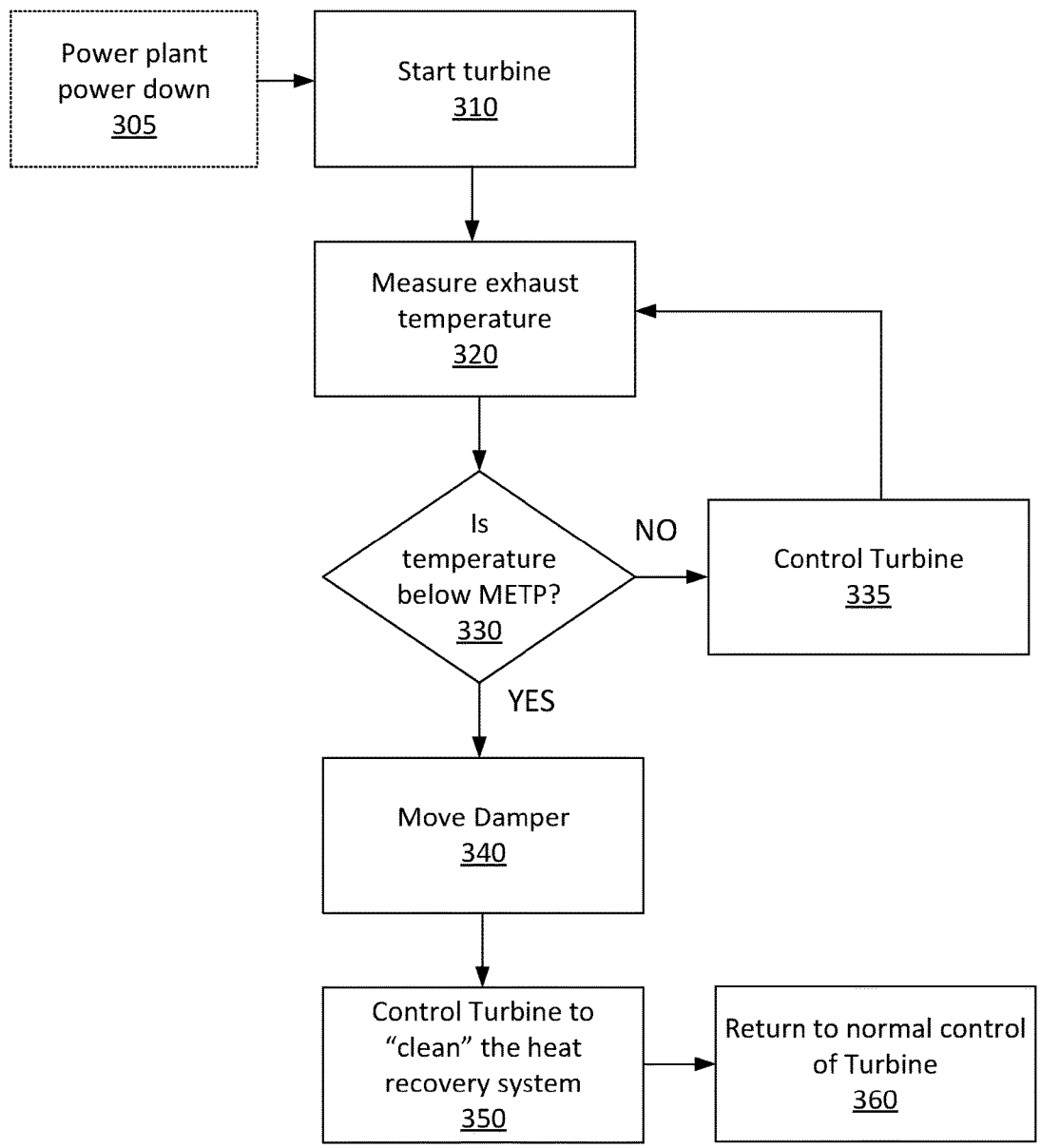
FIG. 3 illustrates a method for purging a power plant including turbine and a heat recovery system according to an embodiment of the present disclosure.

FIG. 3 illustrates a method 300 for purging a power plant including turbine and a heat recovery system according to an embodiment of the present disclosure. The method 300 may be performed by one or more control systems of the power plant illustrated in FIG. 1.

The method 300 may include, while the damper is positioned in a first position to block the exhaust from the turbine to the heat recovery system and allow the exhaust from the turbine to enter the bypass stack, starting the turbine 310, and measuring temperature of exhaust gas 320. While the turbine is running, and if the measured exhaust gas temperature is below Maximum Exhaust Temperature for Purge (METP) (YES in step 330), the damper may be controlled to move from the first position to a second position to allow the exhaust from the turbine to enter the heat recovery system and block the exhaust from the turbine to the bypass stack 340. After the damper is positioned in the second position, the operation of the turbine may be controlled to maintain the exhaust gas temperature below the METP for a predetermine time (e.g., at least five minutes) 350. In step 350, the operation of the turbine to maintain the exhaust gas temperature below the METP until at least five volume exchanges of the turbine exhaust and the heat recovery system have occurred. After the conditions to clean the heat recovery system are satisfied (e.g., predetermined time and/or predetermined exchange of volume), the method may proceed to step 360 in which the turbine is controlled in normal operation to generate energy. During normal operation the exhaust temperature may exceed the METP.

If in step 330, the determination is made that the exhaust temperature is not below the METP, the turbine may be controlled in step 335 to reduce the temperature below the METP. The exhaust temperature may be reduced by controlling the turbine to rotate at a slower speed (e.g., a second speed that is lower than the first speed operated at startup). During normal operation the turbine may be controlled to rotate at a third speed that is higher than the second speed. In some embodiments, the turbine engine may be controlled such that the temperature of the exhaust temperature falls below the METP a predetermined amount before opening the damper to allow the turbine exhaust to enter the heat recovery system.

The method 300 may be performed after the power plant is powered down 305 and during the startup of the turbine. At the time the turbine is started, the heat recovery system may not be considered clean. That is, gas may be located in portions of the heat recovery system. Accordingly, the method 300 may allow the diverter to move only if the exhaust fuel gas temperature is below METP or another predetermined temperature. The method 300 may ensure that the bypass stack and the heat recovery system are "clean" before normal operation of the turbine is resumed.

The method 300 may be performed with a power plant in which the turbine burns fuel that is lighter than air. In this case, if some of the gas is trapped in the boiler of the heat recovery system, the gas may rise to the top of the boiler, accumulating away from a bypass damper. Because there is no unburned gas in the heat recovery system in the vicinity of the damper, the trapped gas in the heat recovery system will not be in contact with the hot air or hot surface of the power plant. Further, the temperature of the exhaust may be maintained below desired levels until the heat recovery system is considered clean.

At the time the turbine is started the heat recovery system may by default be considered not clean. The heat recovery system may be considered clean after either a long cold purge sequence or a hot purge sequence. The heat recovery system may continue to be considered clean as long as neither 1) a loss of flame occurs while the damper is opened to the heat recovery system or 2) no flame and loss of sealing air while the damper is closed to the heat recovery system. The heat recovery system may be considered not clean if the sealing air is not monitored during stop or standstill.

Figure 4:
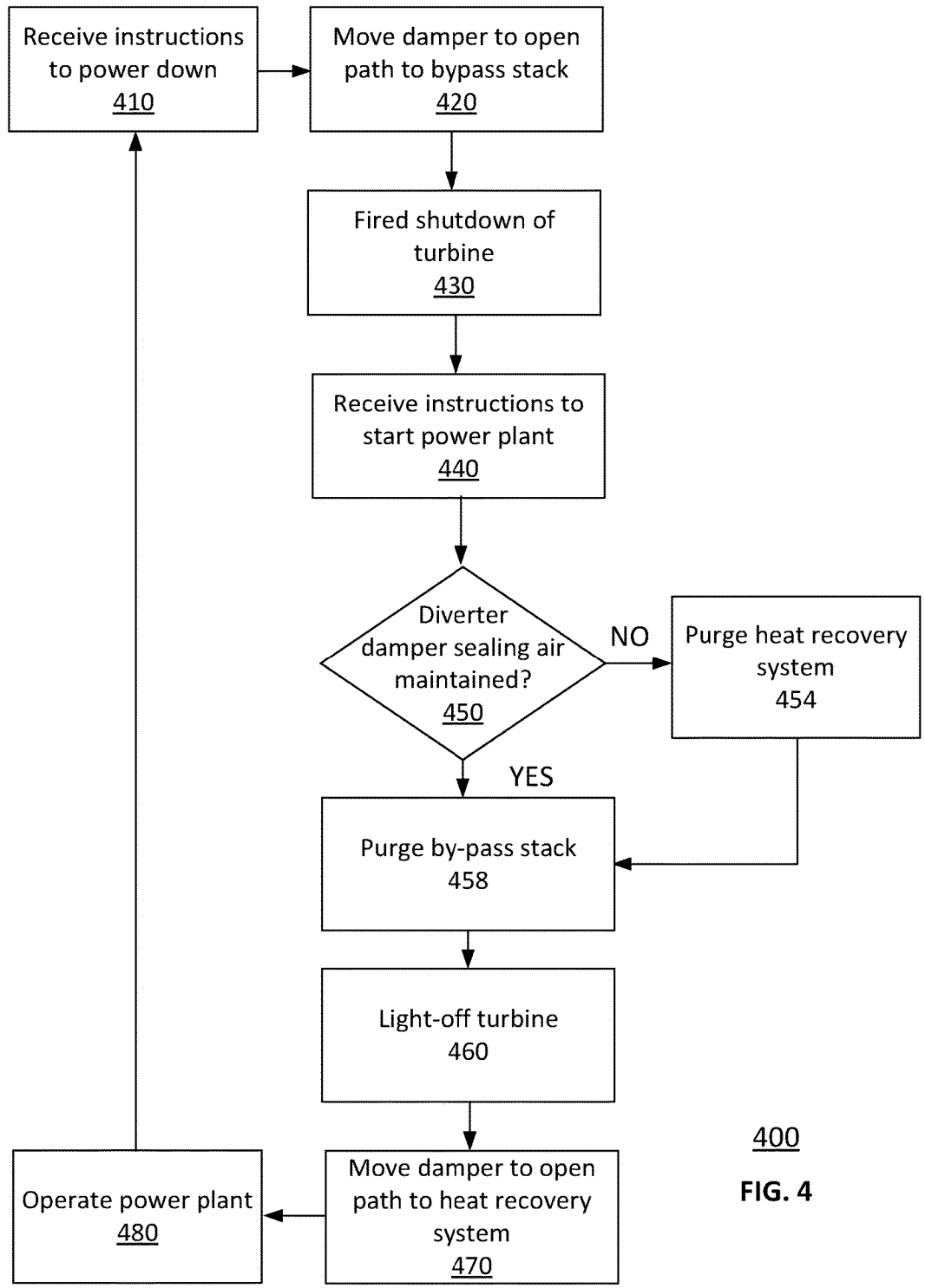
FIG. 4 illustrates a method for operating a power plant including turbine and a heat recovery system according to an embodiment of the present disclosure.

FIG. 4 illustrates a method 400 for operating a power plant including turbine and a heat recovery system according to an embodiment of the present disclosure. The method 400 may be performed on the power plant illustrated in FIG. 1.

During operation of the power plant, instructions may be received to power down the power plant 410. The instructions may be received from an operator via an input device or be automatically generated by the processing system in response to changes in demand for energy and/or one or more parameters monitored by the processing system. The processing system may monitor operating parameters of the power plant such as the temperature at one or more locations of the power plant, composition of turbine exhaust, air pressure, and/or fluid pressure.

When instructions are received to power down the power plant 410, the method may move the damper to open the path to the bypass stack 420. Moving the damper may include controlling the damper to move from a first position directing turbine exhaust to enter the heat recovery system to a second position to allow the turbine exhaust to enter the bypass stack and block the turbine exhaust to the heat recovery system. During this switch of the position of the damper, because flame was present in the combustion chamber, no explosive mixture of gas is introduced into the heat recovery system and it can be considered clean. When the damper is moved to the bypass stack, the processing system may monitor the damper sealing air presence for a determination that the sealing air is tight for fuels not to enter the heat recovery system.

Fired shutdown of the power plant may be performed 430 after the damper is moved to open the bypass stack and close the path to the heat recovery system 420. Because the damper is positioned to seal the heat recovery system during the fired shutdown, unburned fuel that may be present in the turbine exhaust would not enter the heat recovery system.

When instructions are received to start up the power plant 440, a determination may be made as to whether the damper sealing air is maintained 450. If the damper sealing air is not maintained (NO in step 450), a separate purge 454 of the heat recovery system may be needed. The purge of the heat recovery system may be a cold purge or purge performed during the startup (e.g., see purge discussed with reference to FIG. 3).

If the damper sealing air is maintained (YES in step 450), a purge of the by-pass stack 458 may be performed. After the purge of the by-pass stack 458, the turbine may be started 460 and operated without performing a separate purge of the heat recovery system. A separate purge of the heat recovery system may not be needed because the heat recovery system purge credit is obtained due to sealing the heat recovery system before shutting down the turbine and maintaining the sealing of the heat recovery system until startup. The purge of the by-pass stack may be a cold purge or purge performed during the startup. The purge of the by-pass stack may be performed for a predetermined period of time. During the purge of the by-pass stack air may be generated by running the turbine compressor airflow before the turbine ignition. Because the gas used to run the turbine is lighter than air and due to the reduced volume of the system, any turbine exhaust can be easily and quickly eliminated.

During the start of the turbine 460, the bypass stack may optionally be purged for a predetermined time to move a desired volume of air through the bypass stack. The predetermined time may be a small duration considering the volume to be purged.

In some embodiments, a purge of the bypass stack may not be needed. For example, if the gas is lighter than air, potential leakage of gas introduced into the exhaust during the shutdown may evacuate during the startup of the turbine on the bypass path because of the small volume of the stack and the absence of pockets where the gas can accumulate.

After the turbine is started 460, the damper may be moved to open the path to the heat recovery system 470. With the path opened to the heat recovery system, the power plant may be operated 480 according to the desired energy output.

The method 400 may be performed regardless of what kind of fuel is used in the power plant. If fuel used in the power plant is lighter than air, then the purging of both the heat recovery system and the bypass stack may be avoided during startup. If the fuel is heavier than air, then the purging of the heat recovery system may be avoided and the purging of the bypass stack may be performed during the startup.

In case of supplementary fire provided in the boiler of the heat recovery system, the duct burner may be considered a source of unburned gas in the boiler of the heat recovery system. Hazardous conditions may be present when the surface in contact with the accumulated unburned gas is at a temperature above METP. Various methods are known to provide the purge credit for the duct burner.

With the supplementary fire provided in the heat recovery system, the heat recovery system may be considered clean after the bypass closing if the duct burner purge credit is granted according to one of the known methods. In this case, the purge of the heat recovery system may be avoided if both the sealing air is in operation and the duct burner purge credit is granted and not lost.

If the duct burner of the heat recovery system is not granted purge credit, switch-over of the damper while the turbine is fired may be allowed only if the exhaust temperature is below METP. If the duct burner of the heat recovery system is granted purge credit, the damper switch may be made while the turbine is fired if the switch is made within a predetermined time period after the purge. For example, the predetermined time may be 10 minutes after the purge is granted.

If the gas burned in the turbine and the duct burner is lighter than air and some of this gas is trapped in the boiler, it will rise to the top of the boiler and will accumulate away from the diverter damper. However, because of the supplementary firing, the duct burner may still be a source of unburned gas in the boiler that could create hazardous conditions. In this configuration, the turbine should not be ignited and loaded in simple cycle (i.e., with the diverter damper closed to the heat recovery system) without a purge of the heat recovery system.

The heat recovery system purge credit may take into account gas accumulation on the top of the boiler up to a predetermined limit, considering that in any case there is an ignition source at the damper level. With a duct burner double block and bleed valve not confirmed correct, the heat recovery system may not be granted purge credit.

Figure 5:
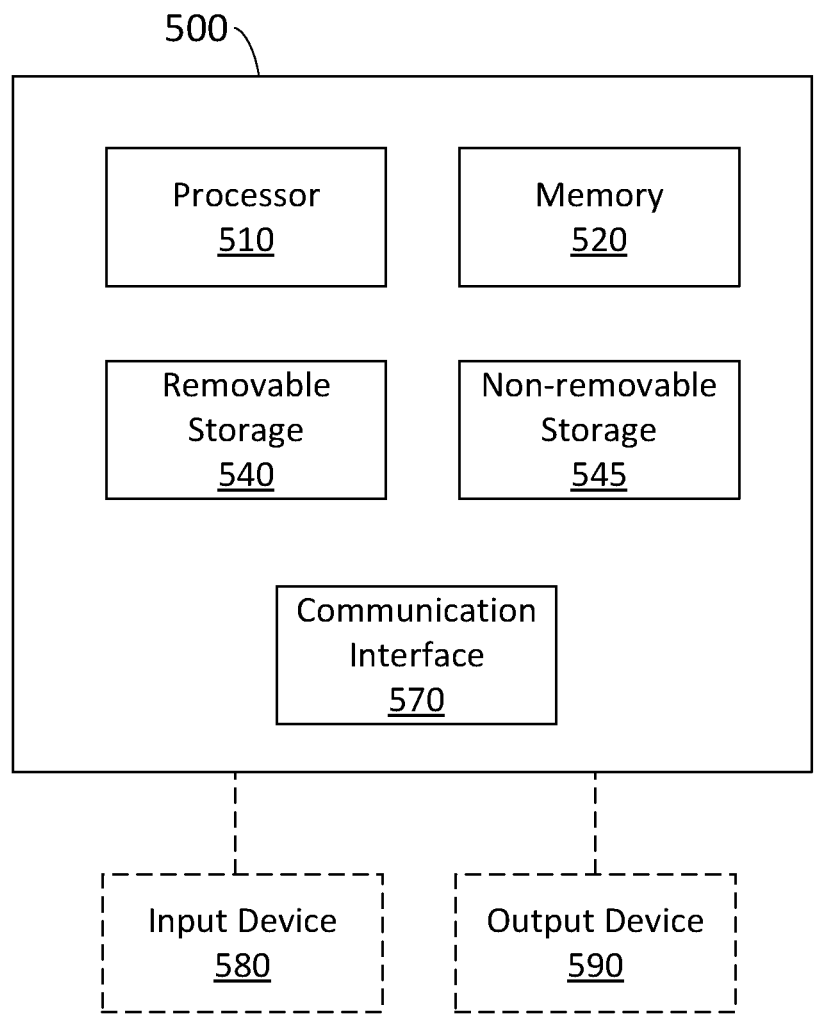
FIG. 5 illustrates an exemplary processing system upon which embodiments of the present invention(s) may be implemented.

FIG. 5 illustrates an exemplary processing system 500 upon which embodiments of the present invention(s) may be implemented. The processing system 500 may include one or more processors 510 and memory 520. The processor 510 may comprise a central processing unit (CPU) or other type of processor. Depending on the configuration and/or type of computer system environment, the memory 520 may comprise volatile memory (e.g., RAM), non-volatile memory (e.g., ROM, flash memory, etc.), or some combination of the two. Additionally, memory 520 may be removable, non-removable, etc.

In other embodiments, the processing system may comprise additional storage (e.g., removable storage 540, non-removable storage 545, etc.). Removable storage 540 and/or non-removable storage 545 may comprise volatile memory, non-volatile memory, or any combination thereof. Additionally, removable storage 540 and/or non-removable storage 545 may comprise CD-ROM, digital versatile disks (DVD) or other optical storage, magnetic cassettes, magnetic tape, magnetic disk storage or other magnetic storage devices, or any other medium which can be used to store information for access by processing system 500.

As shown in FIG. 5, the processing system 500 may communicate with other systems, components, or devices of the power plant via communication interface 570. Communication interface 570 may embody computer readable instructions, data structures, program modules or other data in a modulated data signal (e.g., a carrier wave) or other transport mechanism. By way of example, communication interface 570 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 570 may also couple the processing system 500 to one or more input devices 580 (e.g., a keyboard, mouse, pen, voice input device, touch input device, etc.) and/or output devices 590 (e.g., a display, speaker, printer, etc.). The input devices 580 may be used by an operator to monitor and control the operation of the power plant. The operating status of the power plant may be displayed on an output device 590 and the operation may control what information and/or graphics are displayed on output device 590.

As shown in FIG. 5, portions of the present invention are comprised of computer-readable and computer-executable instructions that reside, for example, in a processing system 500 and which may be used as a part of a general purpose computer network (not shown). It is appreciated that processing system 500 is merely exemplary. As such, the embodiment in this application can operate within a number of different systems including, but not limited to, general-purpose computer systems, embedded computer systems, laptop computer systems, hand-held computer systems, portable computer systems, or stand-alone computer systems.

As will be appreciated, the embodiments of this disclosure may be embodied as a method, system, or computer program product. Accordingly, the embodiments may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the embodiments may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The embodiments of this application are described with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

We claim:

1. A method for operating a power plant including a turbine, a heat recovery system, a bypass stack and an exhaust duct including a damper configured to direct the flow of exhaust from the turbine to the heat recovery system and/or to the bypass stack, the method comprising:
   before flame out during fired shutdown of the turbine, control the damper to move from a first position directing turbine exhaust to enter the heat recovery system to a second position to allow the turbine exhaust to enter the bypass stack and block the turbine exhaust to the heat recovery system;
   while the position of the damper is maintained in the second position to prevent gas and/or vapor to enter the heat recovery system, perform fired shutdown of the turbine;
   in response to instructions to start the turbine, determine whether a damper sealing air pressure is continuously maintained from when the damper was moved from the first position to the second position and until the instructions to start the turbine are received;
   upon determining that the damper sealing air pressure was continuously maintained from when the damper was moved from the first position to the second position and until the instructions to start the turbine are received, generate air flow in the exhaust duct for a predetermined period of time while the position of the damper is maintained in the second position and start the turbine without performing a purge sequence for the heat recovery system;
   upon determining that the damper sealing air pressure was not continuously maintained from when the damper was moved from the first position to the second position and until the instructions to start the turbine are received, start the turbine after generating air flow in the exhaust duct for the predetermined period of time while the position of the damper is maintained in the second position and after performing the purge sequence for the heat recovery system while the position of the damper is maintained in the first position; and
   after starting the turbine, control the damper to move from the second position to the first position to allow the turbine exhaust to enter the heat recovery system and to block the turbine exhaust to the bypass stack.

2. The method of claim 1, wherein the power plant include an isolator provided adjacent to the damper and configured to selectively prevent air and/or gas mixture to enter from the exhaust duct into the heat recovery system, the isolator is configured to prevent air and/or gas mixture to enter from the exhaust duct into the heat recovery system when the damper is in the second position and is configured to allow air and/or gas mixture to enter from the exhaust duct into the heat recovery system when the damper is in the first position.

3. The method of claim 1,
   wherein if a determination is made that the damper sealing air pressure was not continuously maintained from when the damper was moved from the first position to the second position and until the instructions to start the turbine are received:
   while the damper is positioned in the second position to block the exhaust from the turbine to the heat recovery system to allow the exhaust from the turbine to enter the bypass stack, start the turbine;
   measure temperature of exhaust gas;
   control the operation of the turbine so that the measured temperature of the exhaust gas is below a predetermined temperature;
   while the turbine is running and the measured exhaust gas temperature is below the predetermined temperature, control the damper to move from the second position to the first position to allow the exhaust from the turbine to enter the heat recovery system and block the exhaust from the turbine to the bypass stack; and
   after the damper is positioned in the second position, control the operation of the turbine to maintain the exhaust gas temperature below the predetermined temperature for at least five minutes.

4. The method of claim 3, wherein turbine fuel is lighter than air.

5. The method of claim 3, wherein the predetermined temperature is Maximum Exhaust Temperature for Purge (METP).

6. The method of claim 1, wherein the turbine is started without performing a purge of the heat recovery system at startup only if the damper sealing air pressure was continuously maintained from when the damper is moved from the first position to the second position and until start of the turbine.

7. The method of claim 1, wherein the heat recovery system includes duct burners and the method further includes, before fired shutdown of the turbine, turning off the duct burners and performing a purge of the heat recovery system while the damper is in the first position.

8. A power plant comprising:
a turbine;
a heat recovery system;
a bypass stack;
an exhaust duct including a damper configured to selectively direct the flow of exhaust from the turbine to the heat recovery system or to the bypass stack; and
a processing system, including at least one processor, the processing system being configured to at least:
before flame out during fired shutdown of the turbine, control the damper to move from a first position directing turbine exhaust to enter the heat recovery system to a second position to allow the turbine exhaust to enter the bypass stack and block the turbine exhaust to the heat recovery system;
while the position of the damper is maintained in the second position to prevent gas and/or vapor to enter the heat recovery system, perform fired shutdown of the turbine;
in response to request to start the turbine, determine whether a damper sealing air pressure is continuously maintained from when the damper was moved from the first position to the second position and until the request to start the turbine is received;
upon determining that the damper sealing air pressure was continuously maintained from when the damper was moved from the first position to the second position and until the request to start the turbine is received, generate air flow in the exhaust duct for a predetermined period of time while the position of the damper is maintained in the second position and start the turbine without performing a purge sequence for the heat recovery system;
upon determining that the damper sealing air pressure was not continuously maintained from when the damper was moved from the first position to the second position and until the request to start the turbine is received, start the turbine after generating air flow in the exhaust duct for the predetermined period of time while the position of the damper is maintained in the second position and after performing the purge sequence for the heat recovery system while the position of the damper is maintained in the first position; and
after starting the turbine, control the damper to move from the second position to the first position to allow the turbine exhaust to enter the heat recovery system and to block the turbine exhaust to the bypass stack.

9. The power plant of claim 8, wherein the processing system is further configured to: while starting the turbine and while the damper is maintained in the second position, performing a purge sequence of the bypass stack.

10. The power plant of claim 8, wherein
if a determination is made that the damper sealing air pressure was not continuously maintained from when the damper was moved from the first position to the second position and until the request to start the turbine is received:
while the damper is positioned in the second position to block the exhaust from the turbine to the heat recovery system and allow the exhaust from the turbine to enter the bypass stack, start the turbine;
measure temperature of exhaust gas;
control operation of the turbine so that the measured temperature of the exhaust gas is below Maximum Exhaust Temperature for Purge (METP);
while the turbine is running and the measured exhaust gas temperature is below the METP, control the damper to move from the second position to the first position to allow the exhaust from the turbine to enter the heat recovery system and block the exhaust from the turbine to the bypass stack; and
after the damper is positioned in the second position, control the operation of the turbine to maintain the exhaust gas temperature below the METP for at least five minutes.

11. The power plant of claim 8, wherein the heat recovery system includes duct burners and the processing system is further configured to: before fired shutdown of the turbine, turning off the duct burners and perfuming a purge of the heat recovery system while the damper is in the first position.

12. The power plant of claim 8, wherein turbine fuel is lighter than air.

13. The power plant of claim 8, wherein the heat recovery system comprises an isolator provided adjacent to the damper and configured to selectively prevent air and/or gas mixture to enter from the exhaust duct into the heat recovery system, and the processing system is configured to control the isolator to prevent air and/or gas mixture to enter from the exhaust duct into the heat recovery system when the damper is in the second position and to allow air and/or gas mixture to enter from the exhaust duct into the heat recovery system when the damper is in the first position.

* * * * *